(12) United States Patent
Alfermann et al.

(10) Patent No.: US 10,693,340 B2
(45) Date of Patent: Jun. 23, 2020

(54) ELECTRICAL ISOLATION OF AN ALTERNATOR

(71) Applicant: BorgWarner Inc., Auburn Hills, MI (US)

(72) Inventors: Timothy J. Alfermann, Carmel, IN (US); Daniel E. Wilkins, Fishers, IN (US); Drake J. Sayre, Middletown, IN (US)

(73) Assignee: BORGWARNER INC., Auburn Hills, MI (US)

(*) Notice: Subject to any disclaimer, the term of this patent is extended or adjusted under 35 U.S.C. 154(b) by 426 days.

(21) Appl. No.: 15/782,601

(22) Filed: Oct. 12, 2017

(65) Prior Publication Data
US 2018/0109160 A1    Apr. 19, 2018

Related U.S. Application Data

(60) Provisional application No. 62/409,689, filed on Oct. 18, 2016.

(51) Int. Cl.
| | |
|---|---|
| *H02K 5/22* | (2006.01) |
| *H02J 7/16* | (2006.01) |
| *H02K 11/27* | (2016.01) |
| *H02J 7/14* | (2006.01) |
| *H02P 9/48* | (2006.01) |
| *H02K 11/05* | (2016.01) |
| *B60R 16/03* | (2006.01) |
| *H02K 5/16* | (2006.01) |
| *H02K 11/042* | (2016.01) |
| *H02P 9/38* | (2006.01) |
| *H01H 85/02* | (2006.01) |

(52) U.S. Cl.
CPC ............. *H02K 5/225* (2013.01); *B60R 16/03* (2013.01); *H02J 7/1461* (2013.01); *H02J 7/16* (2013.01); *H02J 7/166* (2013.01); *H02K 5/161* (2013.01); *H02K 11/042* (2013.01); *H02K 11/05* (2016.01); *H02K 11/27* (2016.01); *H02P 9/38* (2013.01); *H02P 9/48* (2013.01); *H01H 2085/025* (2013.01)

(58) Field of Classification Search
CPC ........ H02K 5/225; H02K 11/05; H02K 11/27; H02K 5/161; H02K 11/042; H02J 7/1461; H02J 7/16; H02J 7/166; H02P 9/38; H02P 9/48; H01H 2085/025; B60R 16/03
See application file for complete search history.

(56) References Cited

U.S. PATENT DOCUMENTS

| | | | |
|---|---|---|---|
| 7,102,304 B2 * | 9/2006 | Sebille ................... | F02N 11/04 180/65.1 |
| 8,610,383 B2 * | 12/2013 | De Sousa ............. | B60L 15/007 318/139 |
| 2010/0025131 A1 * | 2/2010 | Gloceri ................... | B60G 3/20 180/65.28 |

* cited by examiner

Primary Examiner — Emily P Pham
(74) Attorney, Agent, or Firm — Cantor Colburn LLP

(57) ABSTRACT

An alternator for generating electrical power to one or more components of a power network includes a machine portion including a stator, a rotor and a rectifier, a battery connection terminal connected to the machine portion and configured to be connected to a battery, and an isolation device integral to the alternator. The isolation device is located on an electrical path between at least the machine portion and the battery connection terminal, and the isolation device is configured to isolate at least one of the alternator and another component of the power network from receiving electric current from the battery based on an undesirable condition occurring in the power network.

20 Claims, 17 Drawing Sheets

ELECTRICAL ISOLATION OF AN ALTERNATOR

CROSS REFERENCE TO RELATED APPLICATIONS

This application is a non-provisional of U.S. Application Ser. No. 62/409,689 filed Oct. 18, 2016, the disclosure of which is incorporated by reference herein in its entirety.

BACKGROUND

Exemplary embodiments pertain to the art of electric machines and, more particularly, to a component for isolating an alternator and/or other components of a power network.

Many motor vehicles include an alternator that transforms mechanical energy into electrical energy that is used to charge an onboard battery. Alternators are generally open air generation devices which have the ability to provide large amounts of current to vehicle power networks. During certain extreme failure modes (e.g., mistreatment, excessive heat due to vehicle failure), the alternator may become compromised in a manner where it no longer sources current and, due to failure imposed on it, becomes a path of a B+ to ground short. This can result in excessive energy into the alternator and cause thermal damage, as well as drain the battery and compromise the power network.

SUMMARY

An embodiment of an alternator for generating electrical power to one or more components of a power network includes a machine portion including a stator, a rotor and a rectifier, and a battery connection terminal connected to the machine portion and configured to be connected to a battery. The alternator also includes an isolation device integral to the alternator, the isolation device located on an electrical path between at least the machine portion and the battery connection terminal, the isolation device configured to isolate at least one of the alternator and another component of the power network from receiving electric current from the battery based on an undesirable condition occurring in the power network.

An embodiment of a method of controlling electrical power supply to one or more components of a power network includes operating a machine portion of an alternator to generate electricity, the machine portion including a stator, a rotor and a rectifier, and transmitting electric power to a battery via a battery connection terminal of the alternator. The method also includes, based on an undesirable condition occurring in the power network, isolating at least one of the alternator and another component of the power network from receiving electric current from the battery, the isolating performed by an isolation device integral to the alternator, the isolation device located on an electrical path between at least the machine portion and the battery connection terminal.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
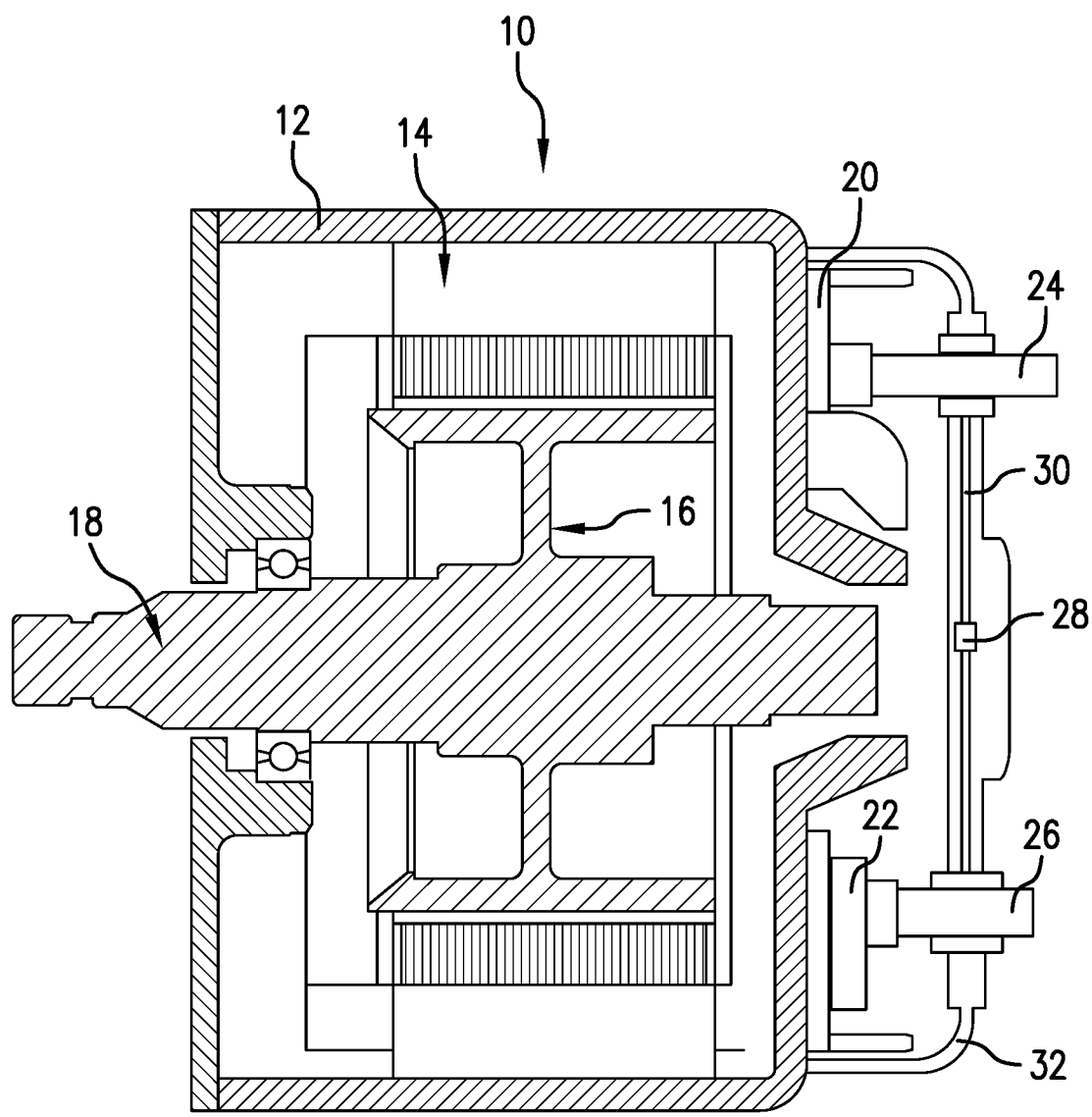
FIG. 1 depicts an embodiment of an alternator.

A detailed description of one or more embodiments of the disclosed apparatus and method are presented herein by way of exemplification and not limitation with reference to the Figures.

There are provided devices, systems and methods for isolating components of a power network that includes an alternator. An embodiment of an alternator or component thereof includes an isolation device integral with the alternator that can isolate portions of the alternator in the event of a failure in the power network and/or isolate one or more other sections of the power network. The isolation device may be actuated (e.g., based on alternator current exceeding a threshold) to isolate portions of the alternator to, for example, prevent backflow of current. In one embodiment, the isolation device and isolated terminal as described below provides a means to divide a power network into multiple sub-networks that can be separately powered or isolated.

The alternator may include a fuse integral to the alternator, which can disable (i.e., disconnect from a power supply such as a battery) all or part of the alternator in the event of an overcurrent condition. In one embodiment, the fuse is located between a vehicle or battery connection terminal and at least a machine portion (including a stator, rotor and rectifier) of the alternator. For example, the fuse is located along an electrical path between the battery connection terminal and the machine portion of the alternator. The fuse may be located such that when the fuse is opened, the alternator is entirely disconnected from the power supply, or the fuse may be located such that the machine portion of the alternator is disconnected, but power to other components such as a regulator or controller is maintained.

In one embodiment, the alternator includes a diode integral to the alternator that prevents current from flowing back to the alternator and isolates the alternator from a power supply (e.g., battery) in the event of a machine short condition. In one embodiment, the diode is located between a vehicle or battery connection terminal and at least a machine portion of the alternator. For example, the diode is located along an electrical path between the battery connection terminal and the machine portion of the alternator. The diode may be located such that the alternator is entirely isolated from current flowing from the power supply, or is located such that the machine portion of the alternator is isolated, but power to other components such as a regulator or controller is maintained. In this way, even during certain severe events where the alternator itself or other components have imposed excessive thermal damage, the thermal damage does not lead to battery (B+) to ground shorts.

The diode may also be configured to divide the power network into multiple sub-networks, which can also be leveraged to lower leakage current for the system as well as isolate multiple-battery systems. For example, the diode is configured to establish sub-networks that can be used to supply backup power if a main battery and the alternator is disabled. Placement of the diode integral with the alternator also has the advantage of being able to de-energize a more focused area of the power network than convention systems, instead of disconnecting power to the entire network.

In one embodiment, the alternator includes a connection terminal (e.g., a vehicle or battery terminal) that includes one or more isolation features that prevents or reduces current flow from the connection terminal into the alternator during an overcurrent event or other condition during which the isolation device is actuated or during a condition in which excessive current could flow into the alternator. For example, the connection terminal includes metal stud portions or other conductive components that are separated by insulating material that helps prevent large amounts of current from flowing into the alternator, even during extreme thermal events.

FIG. 1 illustrates an embodiment of an alternator 10 configured to provide electrical power to a power network such as a vehicle power network. The alternator 10 includes a housing 12 in which a stator 14 and a rotor assembly 16 is disposed. The rotor assembly 16 is mounted in the housing 12 and supported by a shaft 18.

The alternator also includes a heat sink 20, on which a voltage regulator 22 or other suitable control device is mounted. The regulator 22 may be an integrated circuit regulator internal to the alternator 12.

Various electrical connectors are configured to connect the actuator 12 to other components of the power system. Other components may include, in the example of an automotive power system, one or more batteries, an ignition switch, indicator lights, vehicle electronics and others. For example, the electrical connectors include an electrically isolated vehicle or battery connection terminal 24 that typically connects the alternator to a battery, and a regulator connection terminal 26 that is connected to the regulator 22. Each terminal includes a metal stud, metal stud portions or other conductive components.

The alternator 12 also includes an isolation device 28 configured to provide electrical isolation in the event of a failure, excessive heat, overcurrent and/or other undesirable condition. The isolation device 28 is integral with the alternator 12 (e.g., disposed within the housing 12 or otherwise constructed to be part of the alternator). In one embodiment, the isolation device 28 is connected to at least the machine portion of the alternator 12 and is located between the machine portion and the isolated battery connection terminal 24. In one embodiment, the isolation device 28 is electrically connected along an electrical path (e.g., a wire or metal insert) between the battery connection terminal 24 and the regulator connection terminal 26, but is not so limited. For example, the alternator 10 includes a conductor 30 such as a metal insert that connects the isolation device 28 to the isolated battery connection terminal 24 and the regulator connection terminal 26. As shown in FIG. 1, the isolation device 28 and the metal insert may be molded into or otherwise attached to an alternator cover 32.

In one embodiment, the isolation device 28 is or includes a fuse configured to open automatically in response to current exceeding some threshold. An example of the current threshold is a maximum current output or input, which can be determined based on alternator rating information. Opening the fuse automatically isolates at least the machine portion from the battery to avoid a short.

In one embodiment, the isolation device 28 is or includes a diode that is configured to prevent current from flowing into at least the machine portion of the alternator 10 from the battery. The diode may be used to separate or divide a power network into multiple sub-networks.

Figure 2:
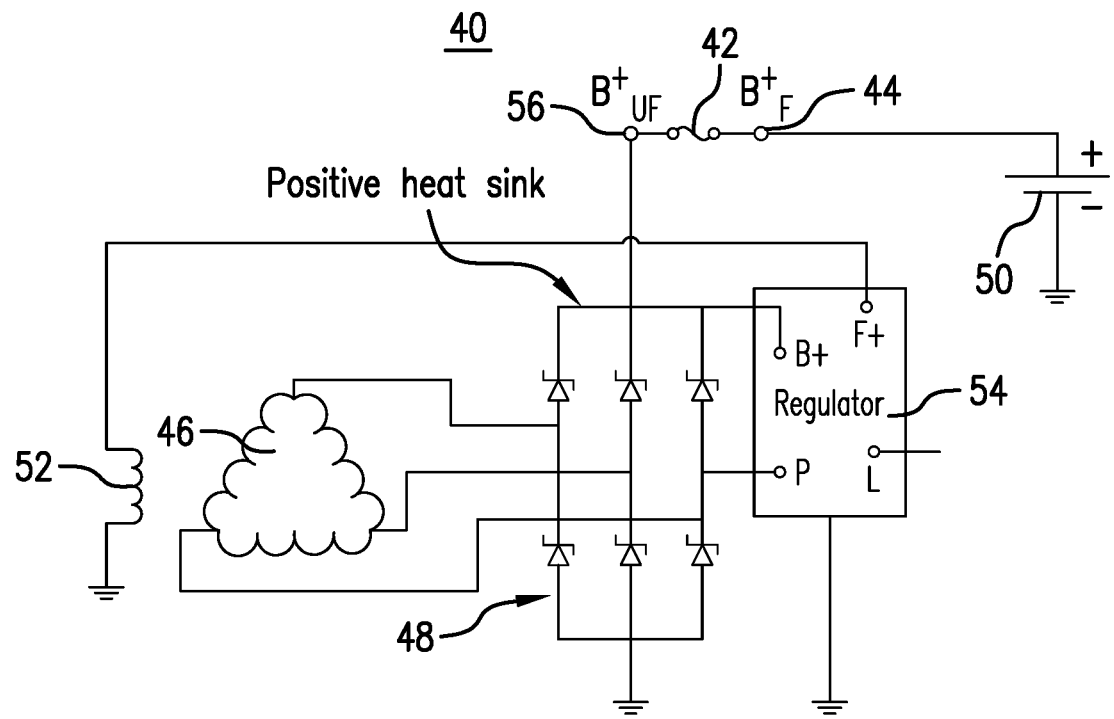
FIG. 2 is a circuit diagram depicting an embodiment of an alternator that includes an integral isolation device configured as a fuse.
Figure 3:
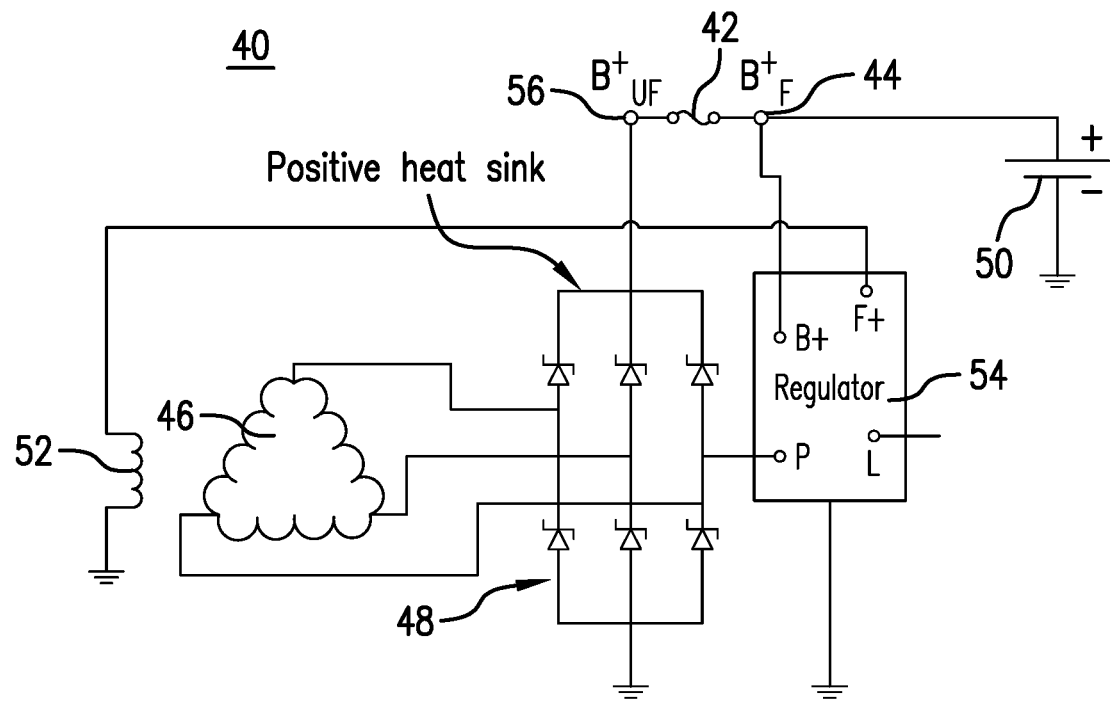
FIG. 3 is a circuit diagram depicting an embodiment of an alternator that includes an integral isolation device configured as a fuse.

FIGS. 2 and 3 are circuit diagrams representing examples of an alternator 40 that includes at least one fuse 42 integral to the alternator 40. The alternator 40 may be the alternator 10 of FIG. 1, a similarly configured alternator or any suitable type of alternator. In these examples, the fuse 42 is connected between at least the machine portion of the alternator 40 and an isolated battery connection terminal 44 of the alternator 40. The machine portion of the alternator 40 includes a stator coil 46 that outputs current to a rectifier bridge 48, which in turn is connected to a battery 50 via the battery connection terminal 44. The rectifier bridge 48 may be embedded in a heat sink. The machine portion also includes a rotor coil 52. A regulator 54 is connected to the rotor coil 52 and adjusts the output voltage from the alternator 40 by adjusting current to the rotor coil 52. In one embodiment, the regulator terminal 26 is connected to the rectifier bridge 48 and may be referred to as a rectifier terminal.

The regulator 54 includes various connection terminals, such as an F+ terminal connecting the regulator to the rotor coil 52 to affect field current at the rotor. Other regulator terminals include, for example, a P terminal for monitoring alternator voltage and an L terminal for powering components such as a charge lamp.

In the example of FIG. 2, the fuse 42 is configured to disconnect the entire alternator (e.g., including both the machine portion and the regulator 54) from the battery if an overcurrent occurs. The regulator 54 in this example includes a B+ terminal that is connected to the rectifier bridge 48 and provides power to the regulator 54.

In the example of FIG. 2, the fuse 42 is connected between the battery terminal 44 (shown as $B^+_F$) and a rectifier terminal 56 (shown as $B^+_uF$). The fuse 42 can be connected by a metal insert or other conductor mounted on or embedded in an alternator cover similar to FIG. 1. In this example, the fuse 42 opens in response to current exceeding a threshold, which entirely disconnects the alternator from the battery. The battery terminal 44 is mechanically grounded to the alternator but electrically isolated when the fuse 42 is open.

FIG. 3 depicts another example, in which actuation of the fuse 42 disconnects the machine portion but maintains a connection between the regulator 54 and the battery 50 so that the regulator 54 can continue to operate. In this example, the machine portion is connected to the battery 50 via the rectifier terminal 56; however the regulator 54 bypasses the fuse 42 and is connected directly to the battery 50 via the battery terminal 44 so that, when the fuse 42 opens, power is still supplied to the regulator 54. This is useful to allow communications between the regulator 54 and another device (e.g., a controller or vehicle control system), such as communications that provide fault or alternator status information.

Figure 4:
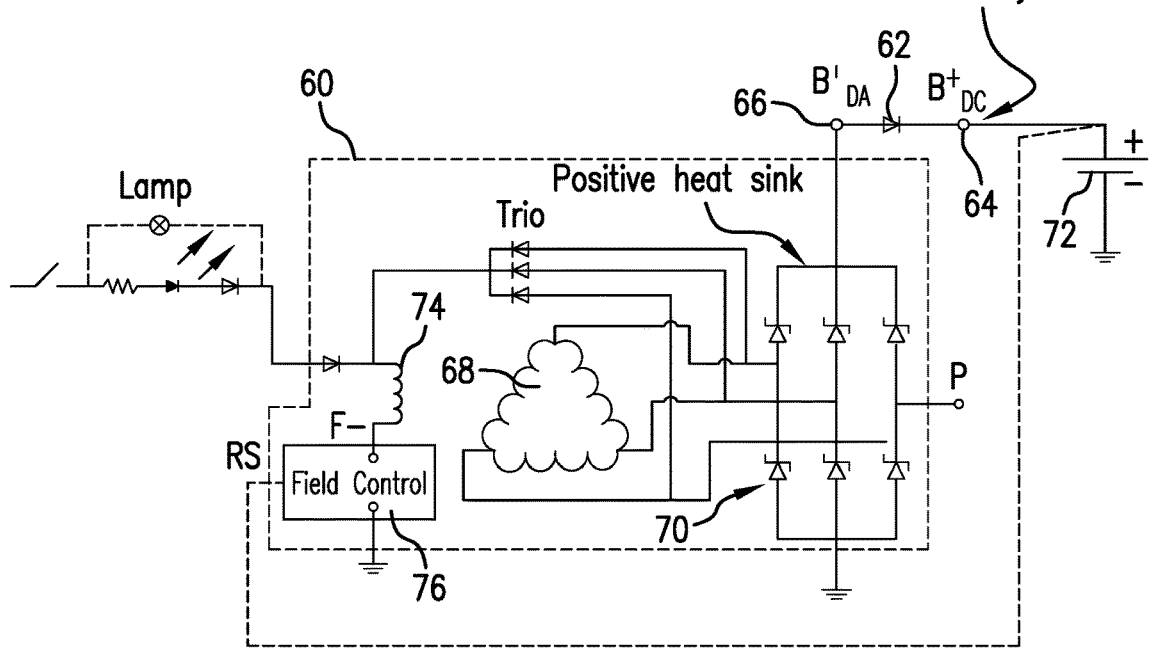
FIG. 4 is a circuit diagram depicting an embodiment of an alternator that includes an integral isolation device configured as a diode.
Figure 5:
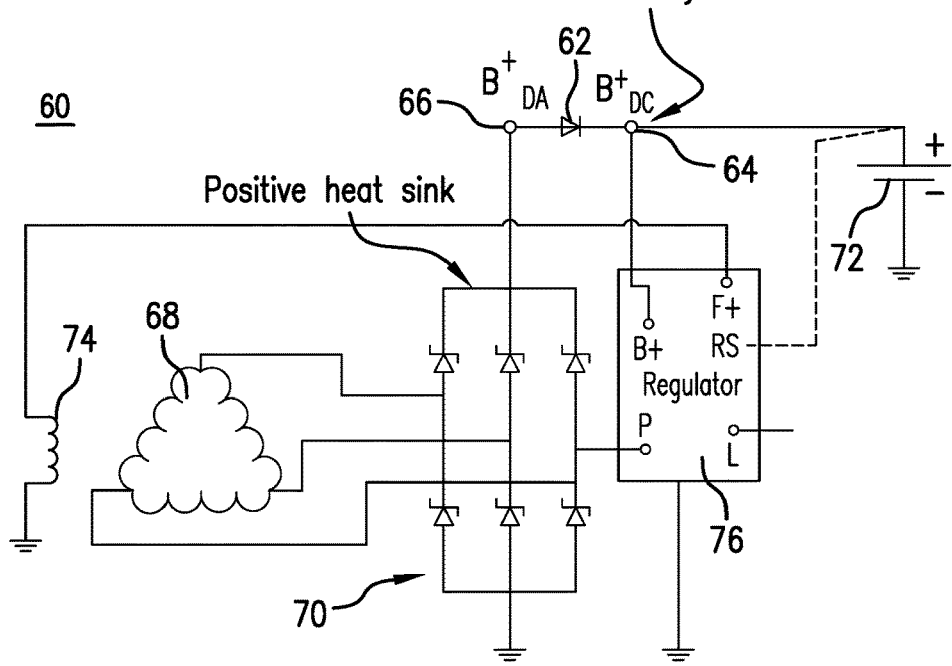
FIG. 5 is a circuit diagram depicting an embodiment of an alternator that includes an integral isolation device configured as a diode.

FIGS. 4 and 5 are circuit diagrams representing examples of an alternator 60 that includes at least one diode 62 connected between at least the machine portion of the alternator 60 and a battery connection terminal 64. In these examples, the diode 62 is connected between at least the machine portion of the alternator 60 and a battery connection terminal 64 (shown as B+Dc) of the alternator 60, e.g., between the battery connection terminal 64 and a rectifier terminal 66 (shown as $B^+_{DA}$). The alternator 60 may be the alternator 10 of FIG. 1, a similarly configured alternator or any suitable type of alternator. The machine portion of the alternator 60 includes stator windings 68 that are connected to a rectifier bridge 70 embedded in a heat sink, which in turn is connected to a battery 72 via the battery connection terminal 64. The machine portion also includes a rotor coil 74 that is controlled by a regulator 76, which in this example is a low side regulator that controls current going to the rotor coil 74.

The diode 62 is configured to allow only forward current from the alternator 60 to other sections of the power network. This helps to isolate an initial failure in a component of the power network and restrict such an initial failure to a smaller section of the power network, and limit further damage due to the initial failure.

In the examples of FIGS. 4 and 5, the diode 62 is located integral with the alternator 60 (e.g., connected between the rectifier terminal 66 and the battery terminal 64). In this way, the battery terminal 64 is mechanically grounded to the alternator 60 but electrically isolated from current flowing from the battery 72 into at least the machine portion.

In the example of FIG. 4, both the machine portion and the regulator 70 are connected to the battery 72 via the rectifier terminal 66. In the example of FIG. 5, only the machine portion is connected to the rectifier terminal 66, and the regulator is connected (e.g., via a B+ terminal on the regulator 76) to the battery terminal 64. Optionally, the regulator 76 can be separately connected to the battery via separate wiring or conductor paths, as shown by the dashed lines in FIGS. 4 and 5, e.g., for controlling voltage output.

In one embodiment, the diode 62 separates the power network into at least a first sub-network including the alternator 60, and a second sub-network including other components of the power network. The diode 62 can thus be used to divide the power network into sub-networks that can be individually powered or disconnected. The sub-networks can be configured in any suitable manner to, e.g., take advantage of the electrical isolation features and decrease overall leakage current.

Figure 6:
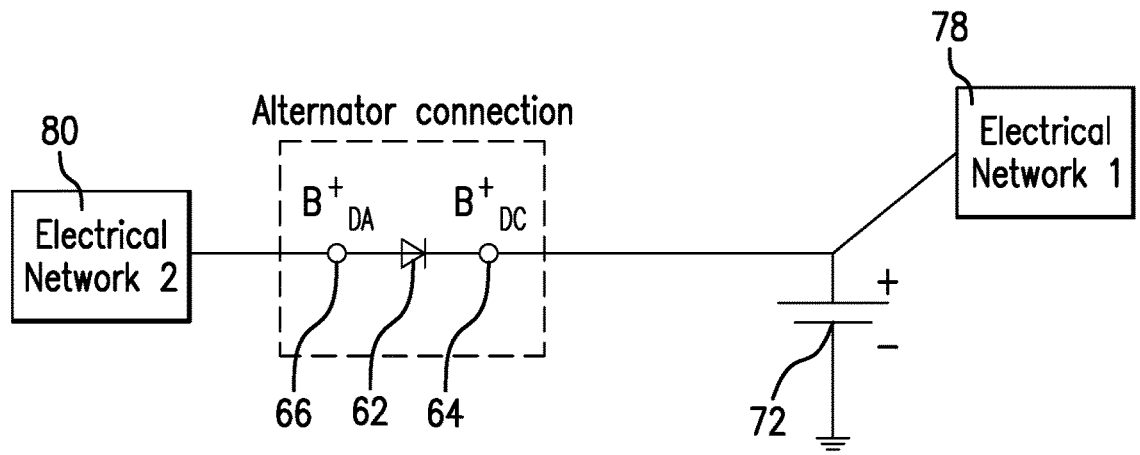
FIG. 6 depicts an embodiment of a power network that includes an alternator, and that is divided into multiple sub-networks by an isolation device integral to the alternator.

For example, as shown in FIG. 6, the diode 62 can be used to establish a first network 78 (shown as "Electrical Network 1") and a second network 80 (shown as "Electrical Network 2"). The battery connection terminal 64 and the network 78 are separately connected to the battery 72. In one configuration, other electrical loads (besides the alternator) in the power network are part of the network 78, and are powered by the battery 72 and allowed to function even if the alternator fails.

In another configuration, which can be effective in reducing off state leakage, the network 80 includes loads that do not need electrical power when the alternator is not generating and the combined sum of power does not exceed the alternator limits. This configuration would lower the leakage on the battery 72 since all components of the network 80 would be limited by the diode 62 leakage current. This configuration would also help to limit the continuous operating current of the diode 62. In one embodiment, both the rectifier terminal 66 and the battery connection terminal 64 are subject to a failsafe operation so that voltage at the rectifier terminal 66 does not voltage at the battery connection terminal 64 by a selected amount, or battery 72 voltage at the rectifier terminal 66 does not exceed a selected absolute limit.

In a further configuration, the network 78 and the network 80 are part of a dual battery powered network, in which the network 78 is considered a backup power supply. In this configuration, the diode 62 acts to prevent the network 78 from back feeding the network 80. The network 78 allows the battery 72 to power the regulator portion of the alternator, while disabling energy flow to the machine portion of the alternator in the event that the alternator becomes compromised.

In the dual battery powered network, the network 80 has a separate battery (not shown) connected thereto. The network 78 can provide power to selected components (e.g., engine ignition) even if the network 80 battery is completely drained. This can be useful in marine and recreational vehicles, as well as other types of vehicles. For example, network 80 includes various loads that may be powered when the alternator and engine are off, and the network 78 is reserved for selected components such as ignition components, so that the selected components can be operated (e.g., to start a vehicle engine) even if no power is available from the network 80 battery.

It is noted that the embodiments and examples described herein are not intended to limit the configuration of the alternator, isolation device or power network. For example, the alternator may include more that one isolation device (e.g., multiple diodes, multiple fuses, or a combination of one or more diodes and one or more fuses). In addition, the examples described herein do not limit the isolation device(s) to the specific locations or wiring configurations shown therein.

Figure 7:
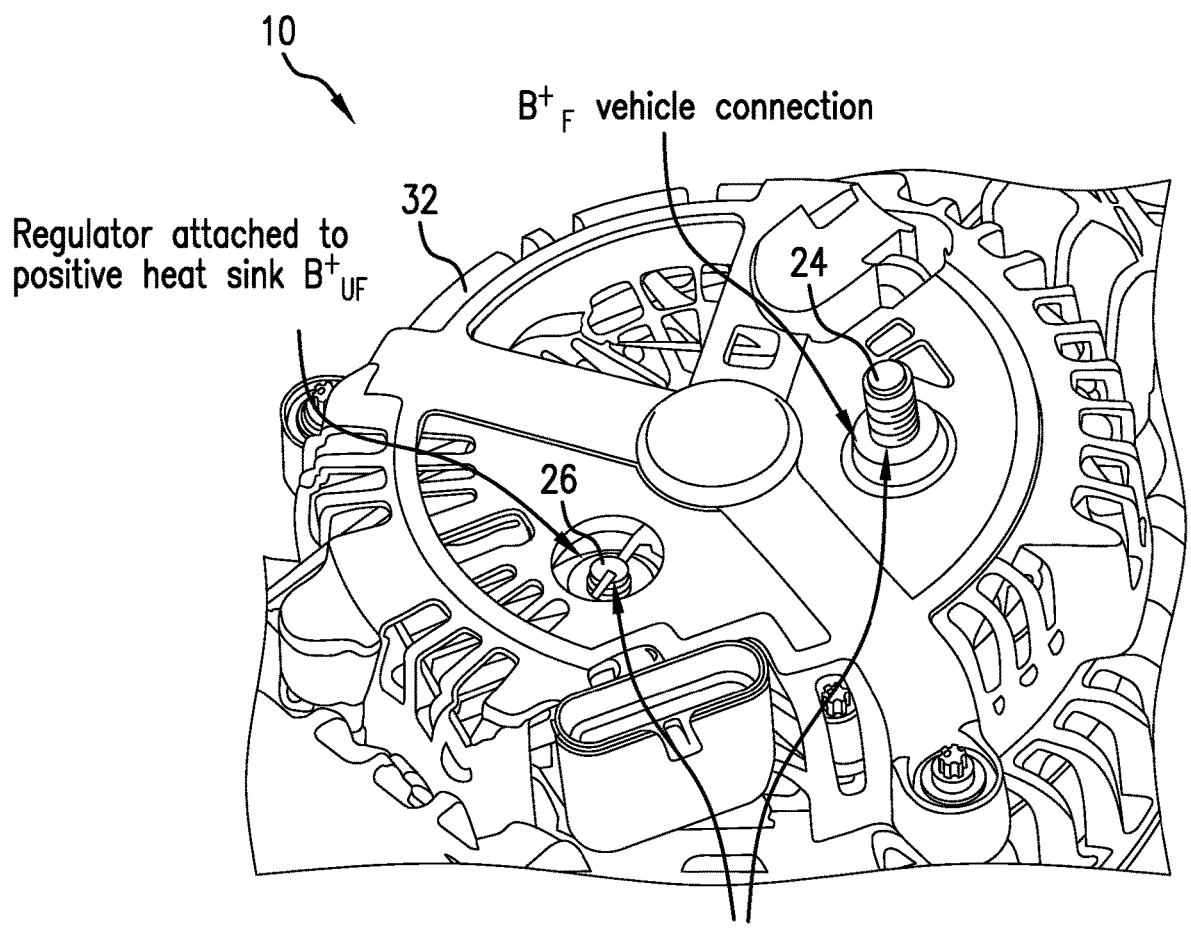
FIG. 7 depicts a portion of an alternator including a connection terminal and an alternator attachment.

In one embodiment, the alternator includes one or more connection terminals that include features designed to facilitate isolation when the isolation device is actuated or otherwise causes electrical isolation of the alternator, or other power network component or sub-network. FIG. 7 shows a top view of an example of the alternator 10 and illustrates an exemplary configuration of the battery connection terminal 24 and the rectifier terminal 26 for discussion purposes.

Figure 8:
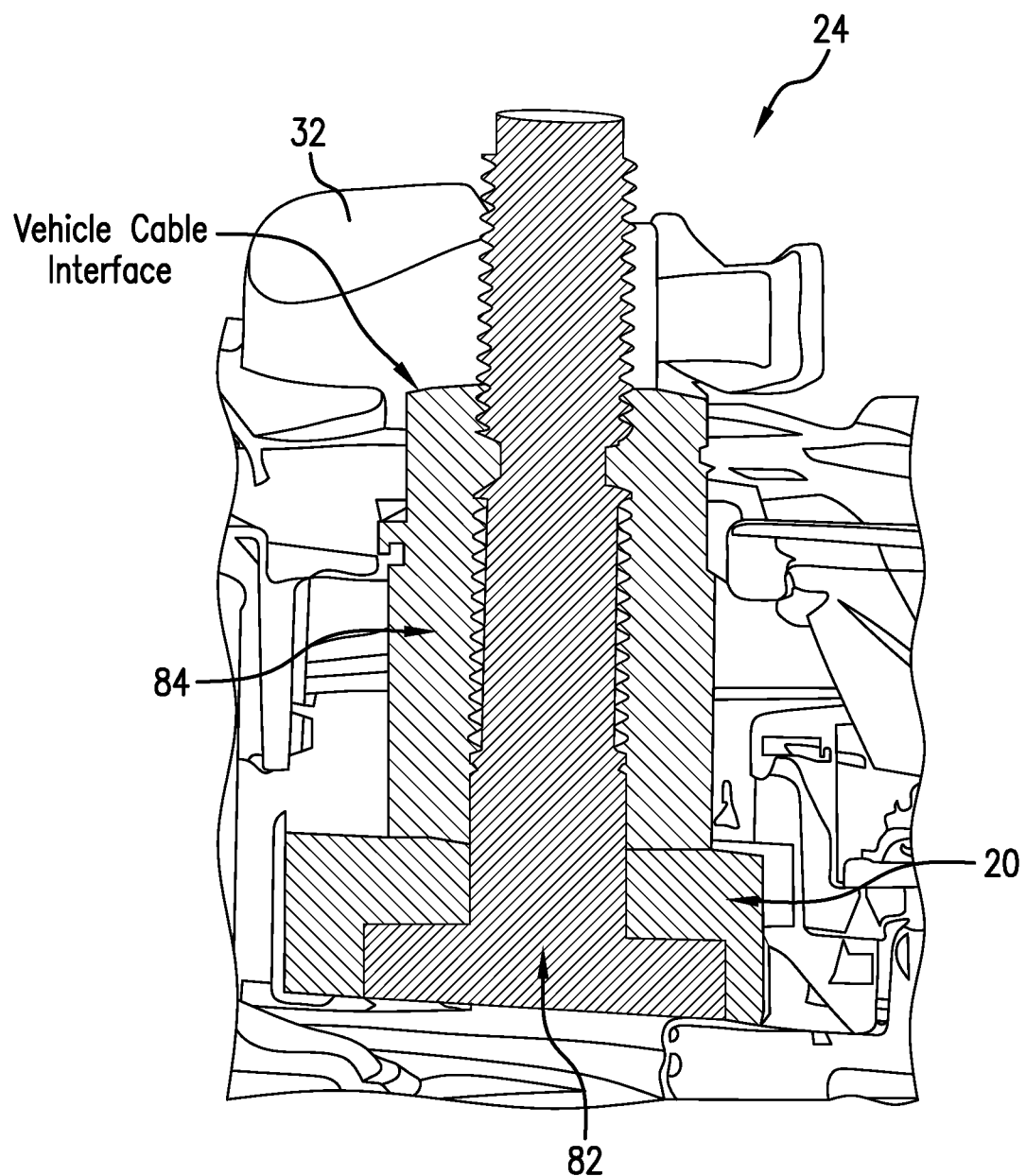
FIG. 8 depicts a conventional connection terminal that is part of an alternator.

FIG. 8 shows a conventional design of an alternator connection terminal such as the battery connection terminal 24. The terminal 24 includes a continuous conductive stud 82 pressed or embedded in the heat sink 20, and secured to the cover 32 by a conductive spacer 84. As shown, in this design, there is no isolation from the positive heat sink 20 through the stud 82.

Figure 9:
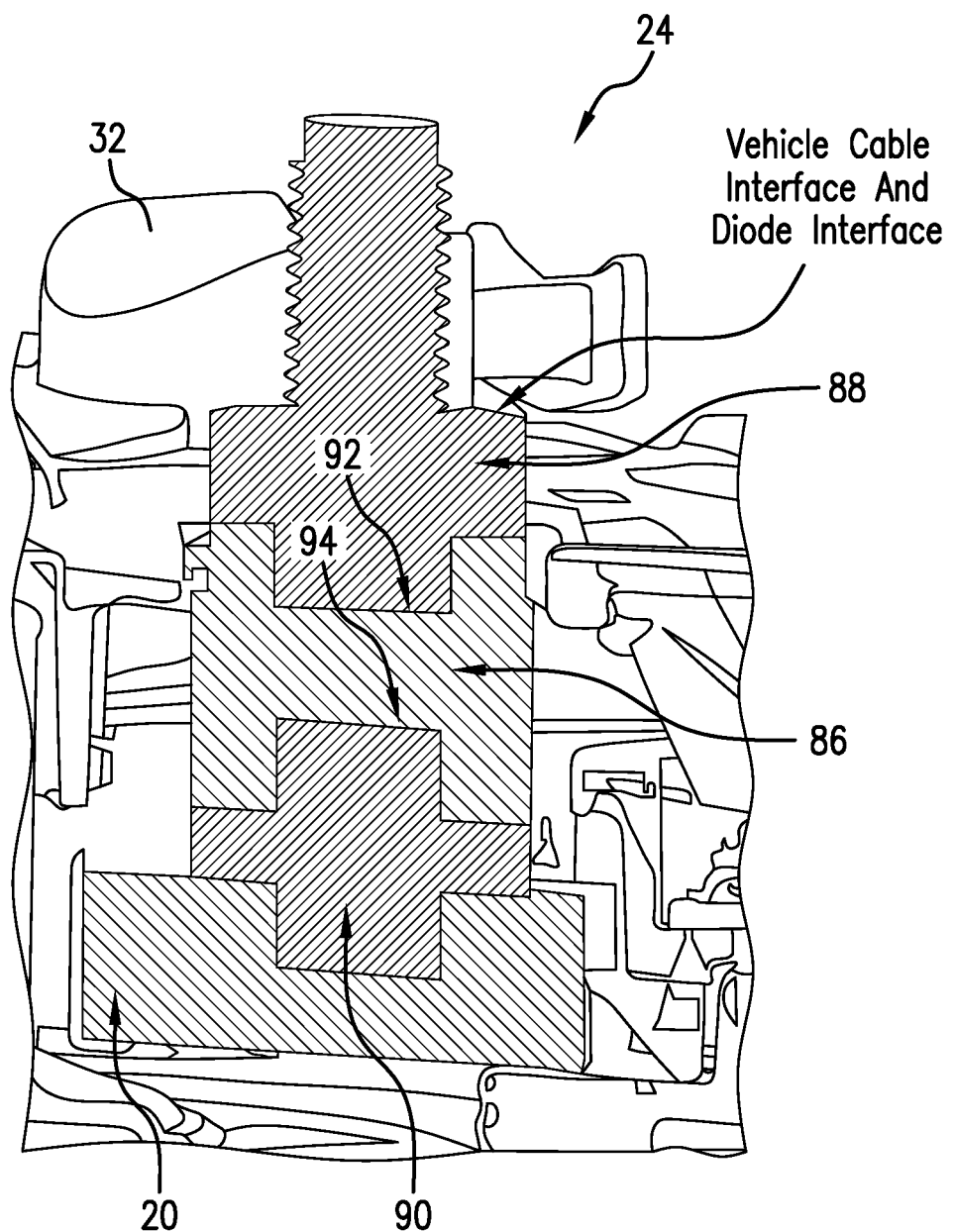
FIG. 9 depicts an embodiment of a connection terminal that is part of an alternator and includes at least one electrical isolation feature.
Figure 10:
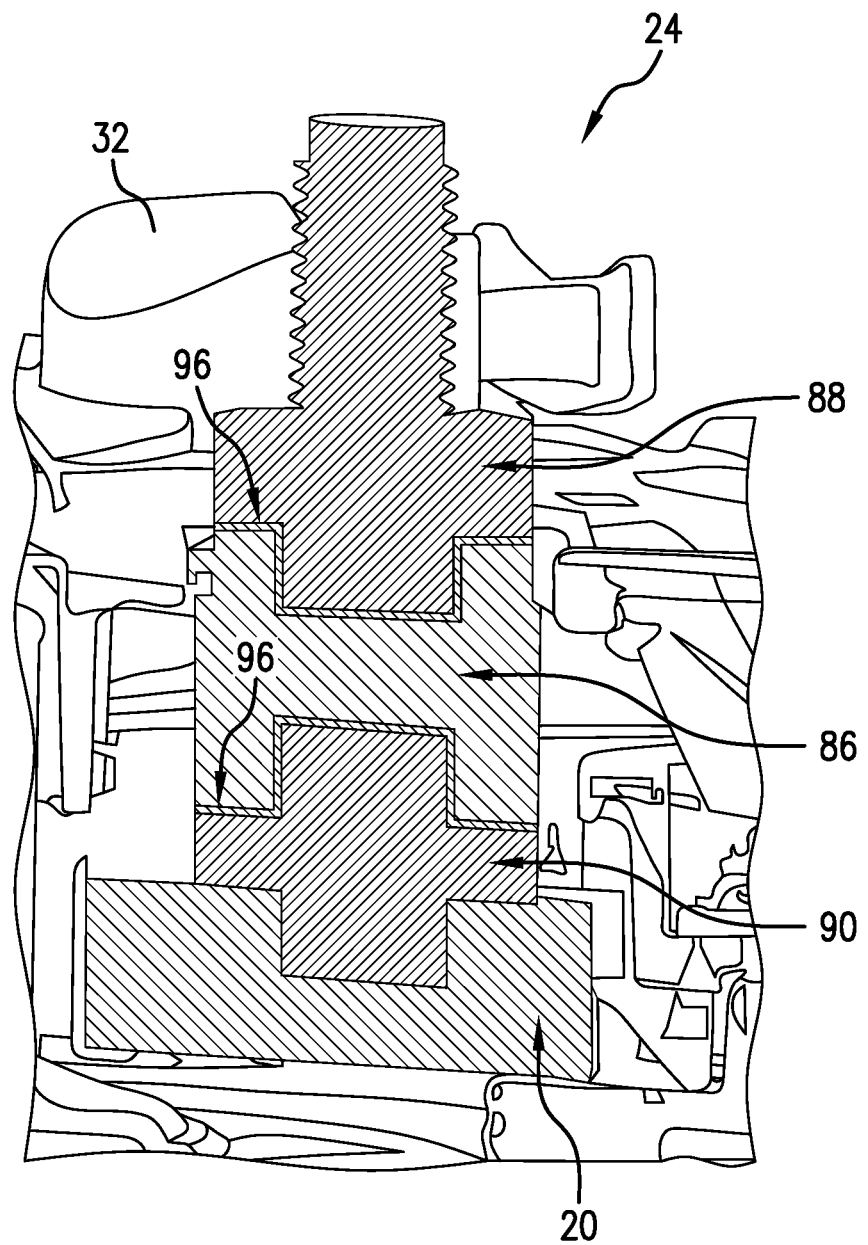
FIG. 10 depicts an embodiment of a connection terminal that is part of an alternator and includes at least one electrical isolation feature.
Figure 11:
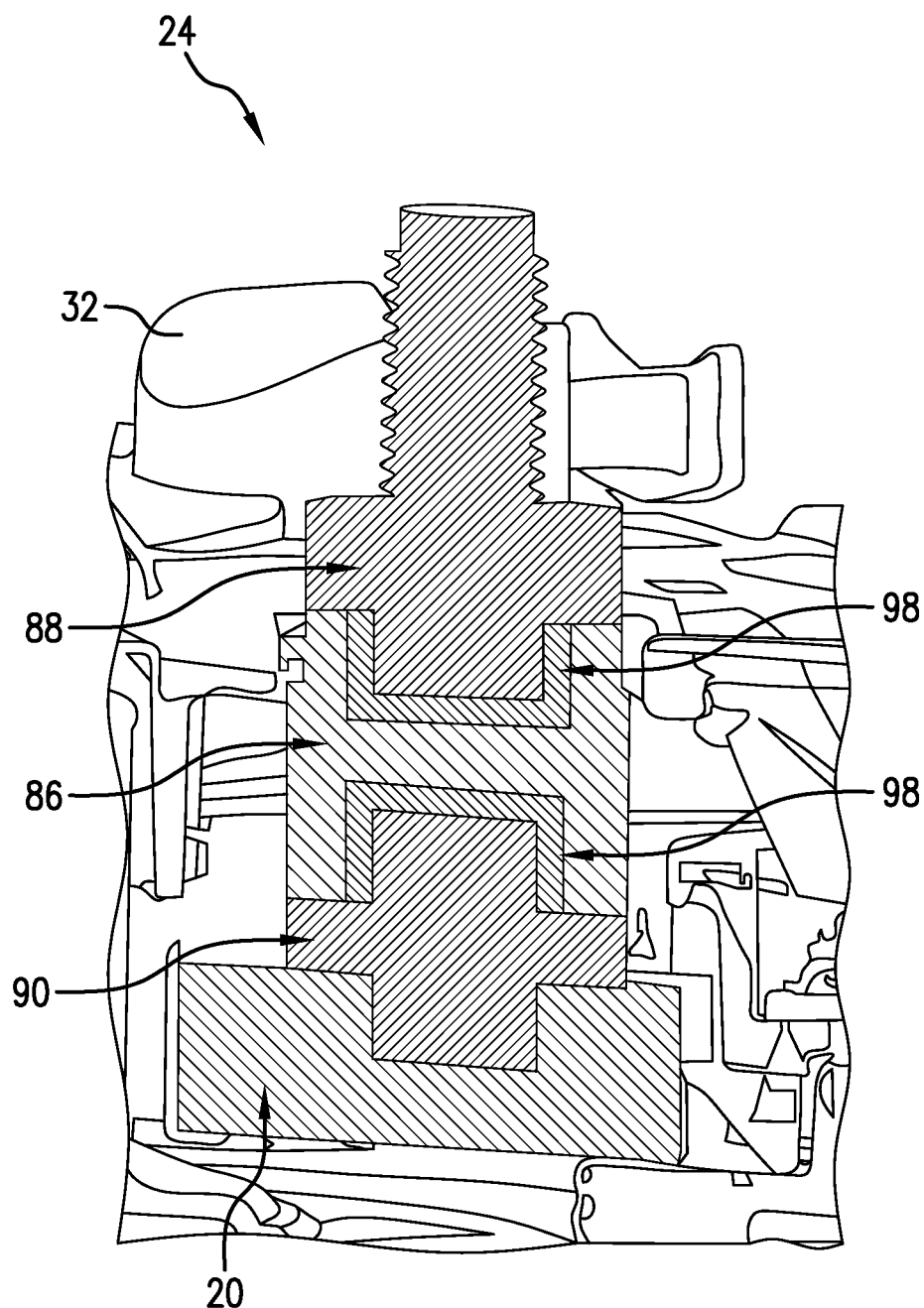
FIG. 11 depicts an embodiment of a connection terminal that is part of an alternator and includes at least one electrical isolation feature.
Figure 12A:
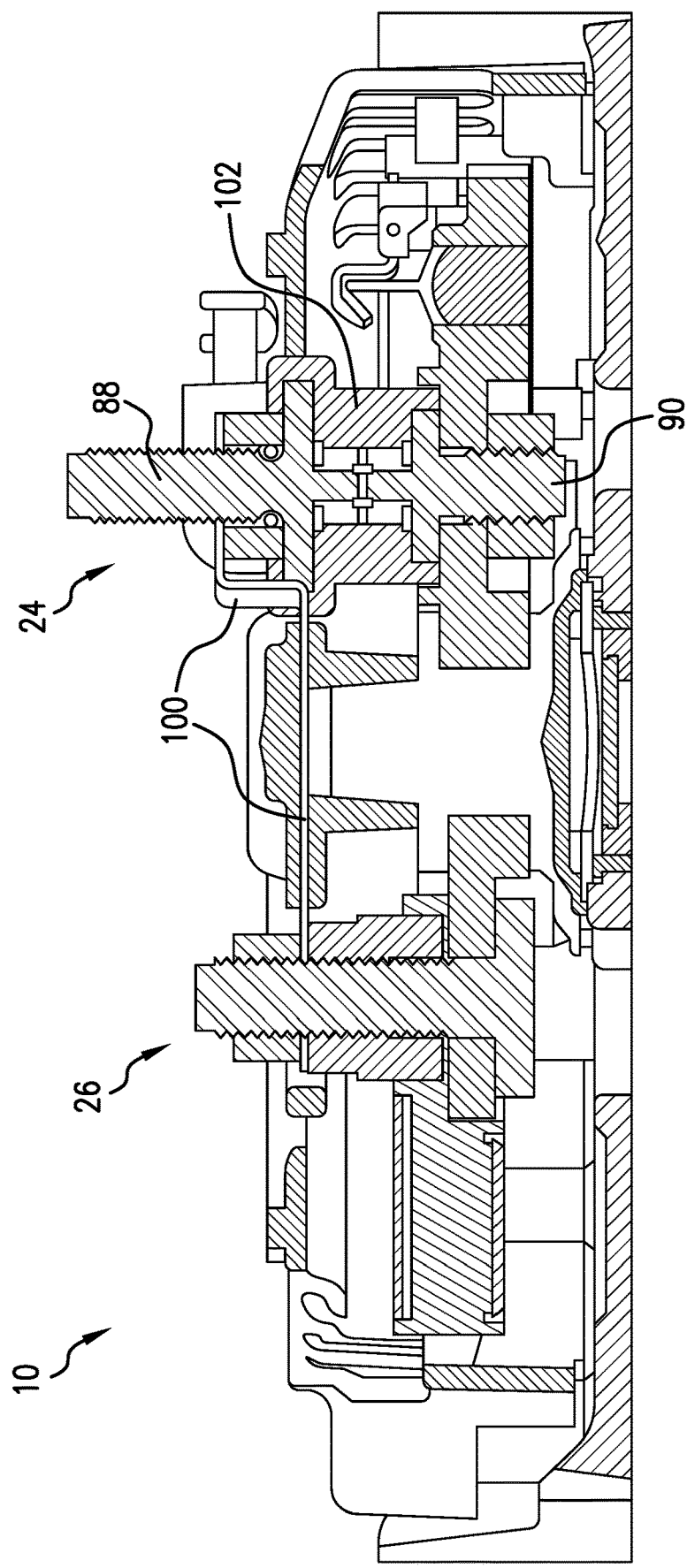
FIGS. 12A-15B depict examples of a connection terminal that is part of an alternator and includes at least one electrical isolation feature.
Figure 12B:
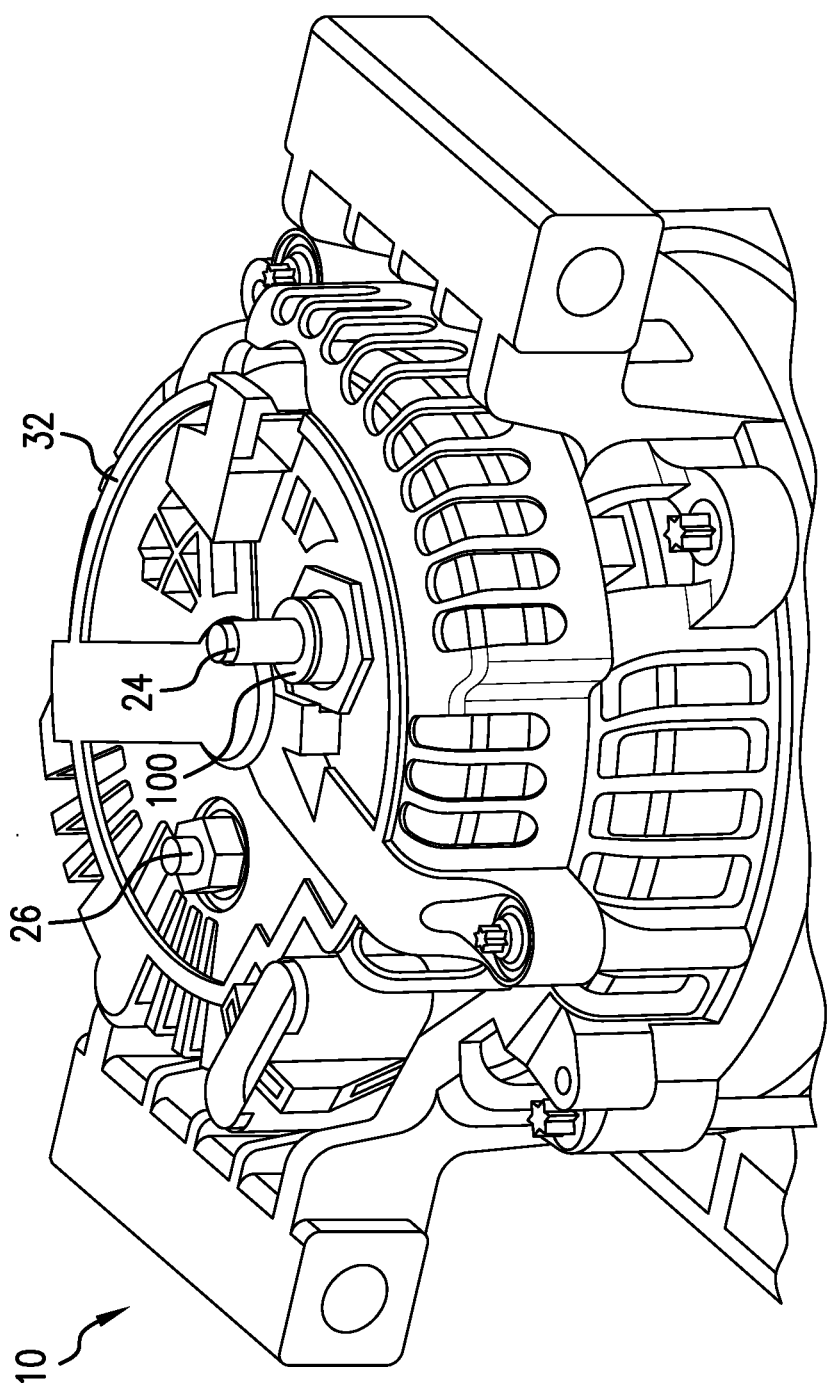
Figure 12C:
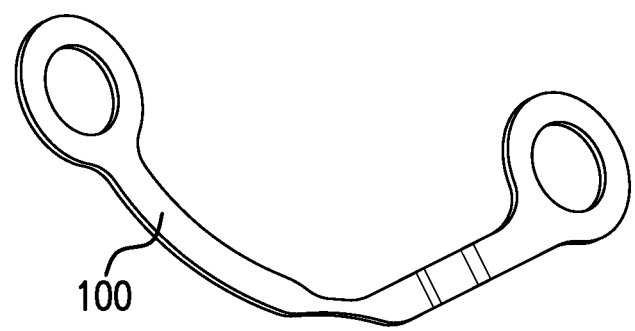
Figure 12D:
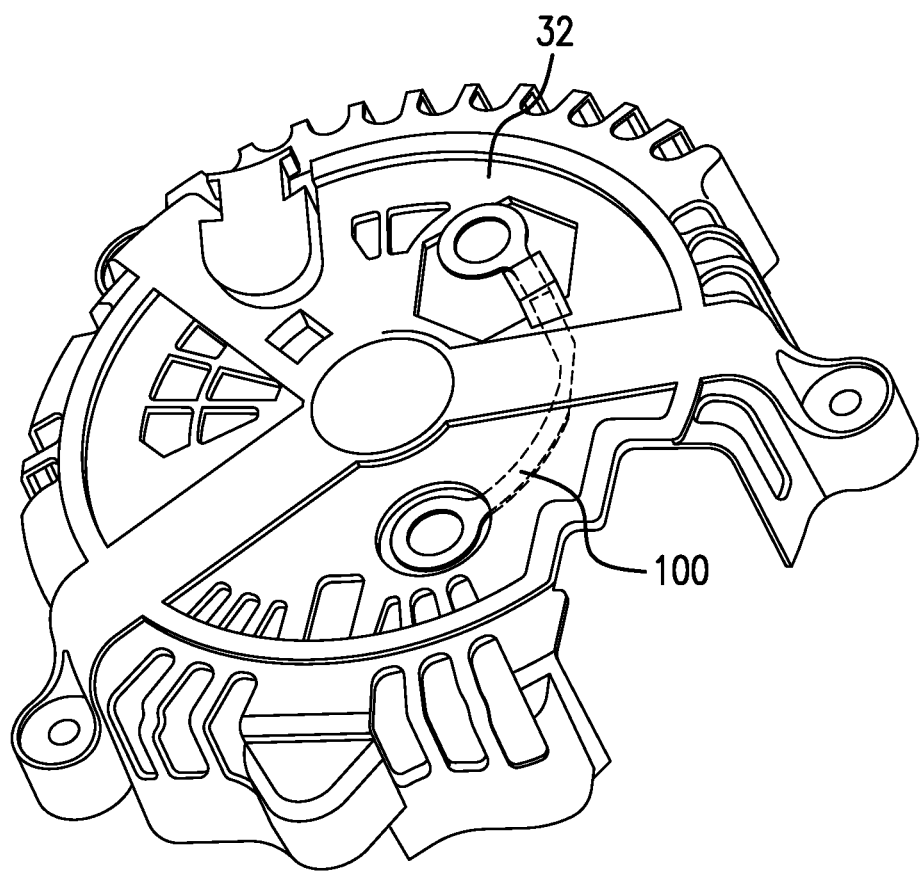
Figure 12E:
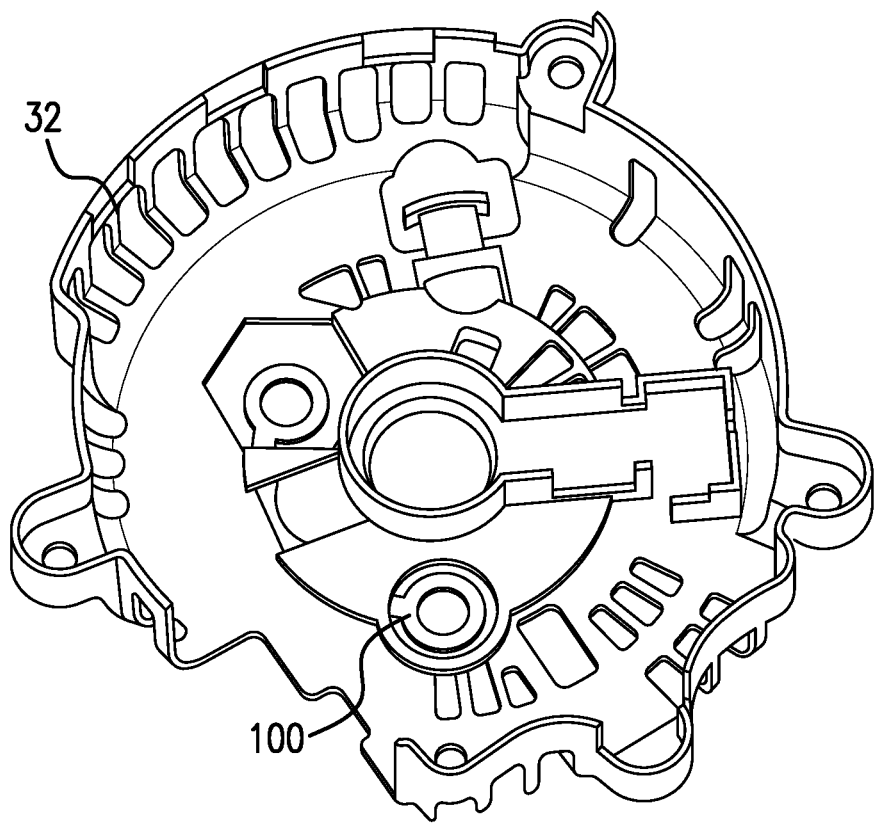

FIGS. 9-11 illustrate embodiments of a connection terminal having one or more isolation features. In each of FIGS. 9-11, the conductive stud 82 is replaced by conductive components separated by an insulating material 86. In these embodiments, the conductive components include an upper or top component 88 (e.g., a stud portion or a metal insert), which is separated from and adjacent to a lower or bottom component 90 (e.g., a stud portion or a metal insert). The lower component 90 may be pressed into or otherwise connected to the heat sink 20. The upper component 88 is not directly connected to the lower component 90, but is instead connected to the alternator 10 via the isolation device (e.g., a fuse or diode). The upper and lower components have adjacent surfaces 92 and 94 that are separated by the insulating material 86 and separated by a sufficient distance so that, during extreme failure which may compromise the insulating material 86, the surfaces adjacent to each other help to maintain isolation.

FIG. 10 shows an embodiment that includes additional insulating material that covers at least the adjacent surfaces 92 and 94. For example, the upper and lower components include an insulating coating 96 on one or more of the components. In one embodiment, the coating 96 covers at least the adjacent surfaces 92 and 94.

In FIG. 11, the terminal 24 includes a high temperature insulative cap 98 attached to each of the adjacent surfaces 92 and 94, such as an anodized aluminum cap. The cap 98 can be pressed or threaded on the end of the upper component 88 and/or on the end of the lower component 90, such that the cap covers at least the most protruding feature of its respective component. The insulating coating 96 and the cap 98 may be disposed on one or both of the components 88 and 90.

FIGS. 12A-E show an example of a connection between the battery connection terminal 24 and the rectifier terminal 26. In this example, the alternator 10 includes a fusible link 100 having ends attached to or connected to the upper terminal 88 and the rectifier terminal 26. The fusible link 100 may be attached to the cover, 32, embedded in the cover 32 or otherwise configured to connect the connection terminal 24 to the machine portion, e.g., via the rectifier terminal 26. Insulating material 102 separates the upper component 88 from the lower component 90, and may also be configured as an insert or other insulating structure to mount portions of the battery connection terminal to the cover 32.

Figure 13A:
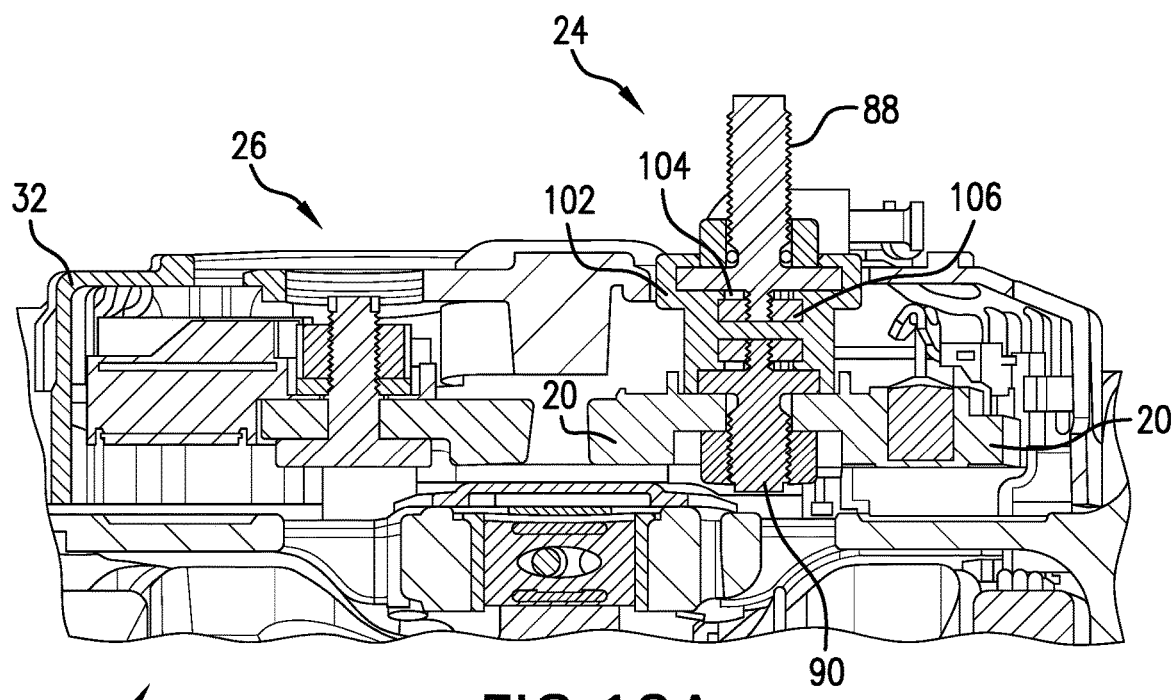
Figure 13B:
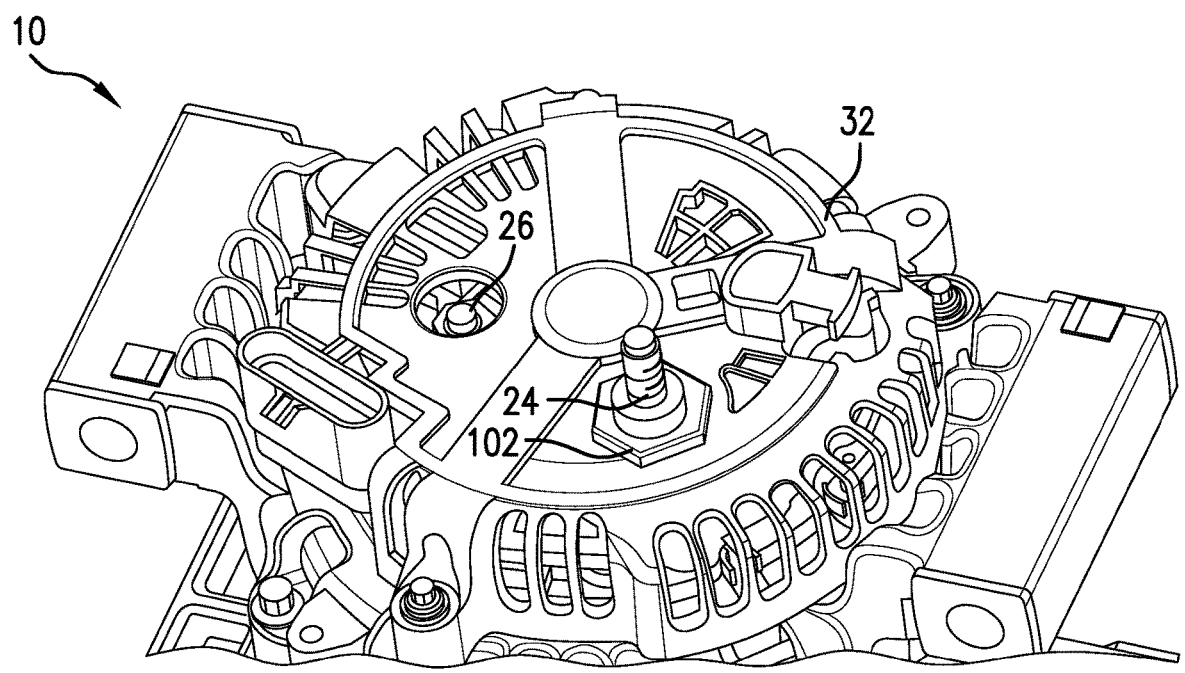
Figure 13C:
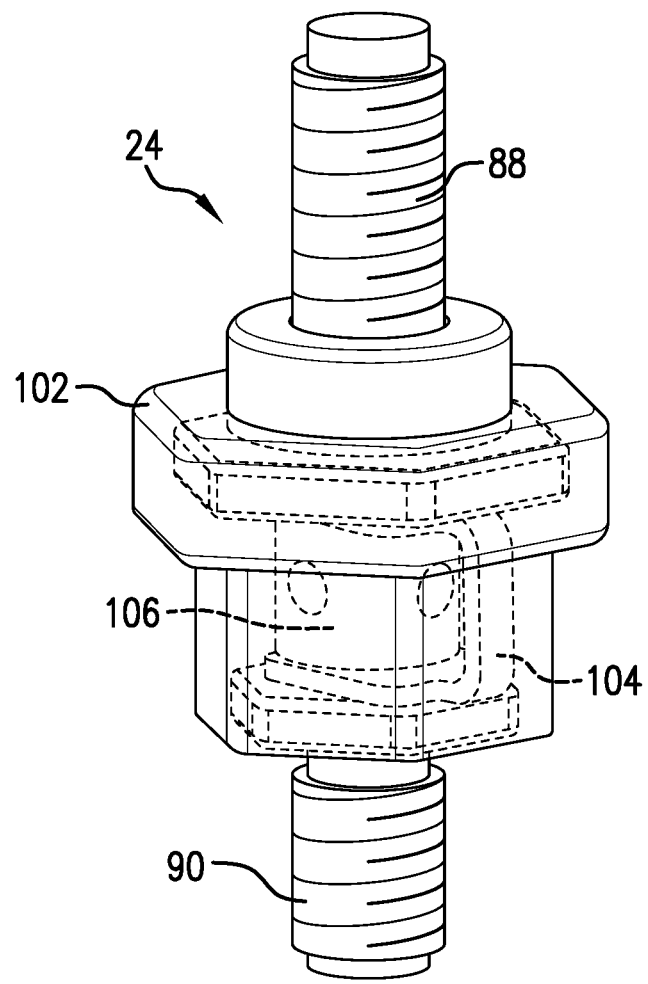
Figure 14A:
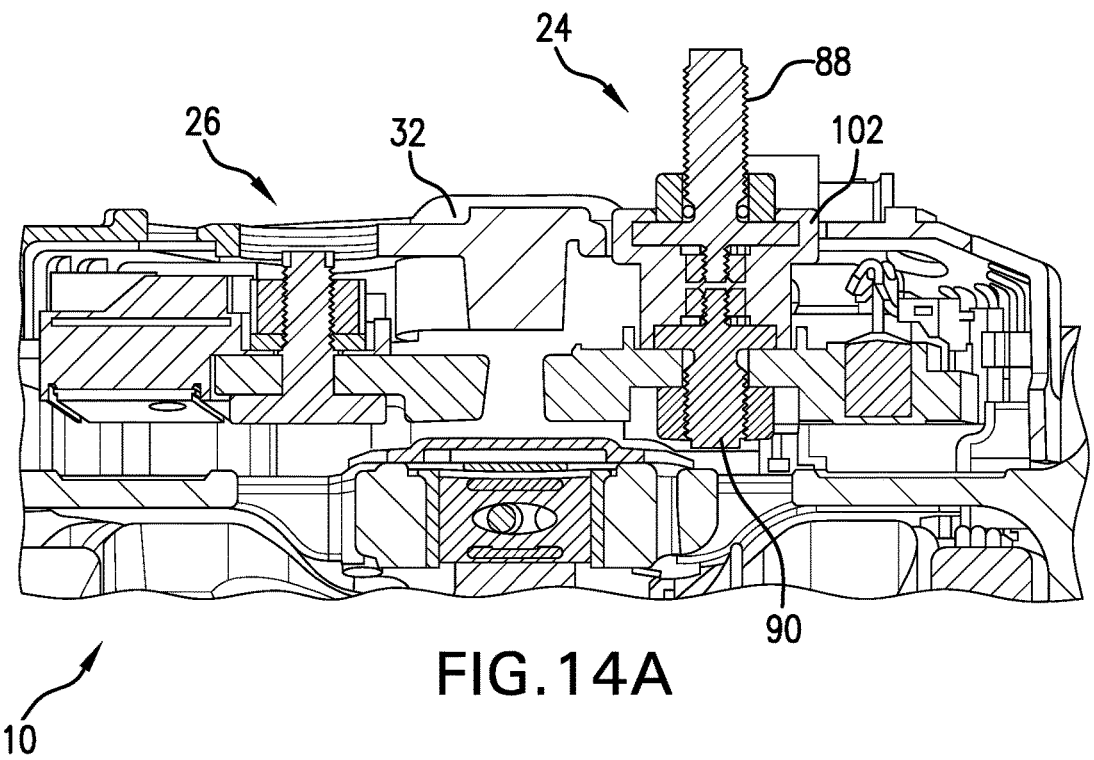
Figure 14B:
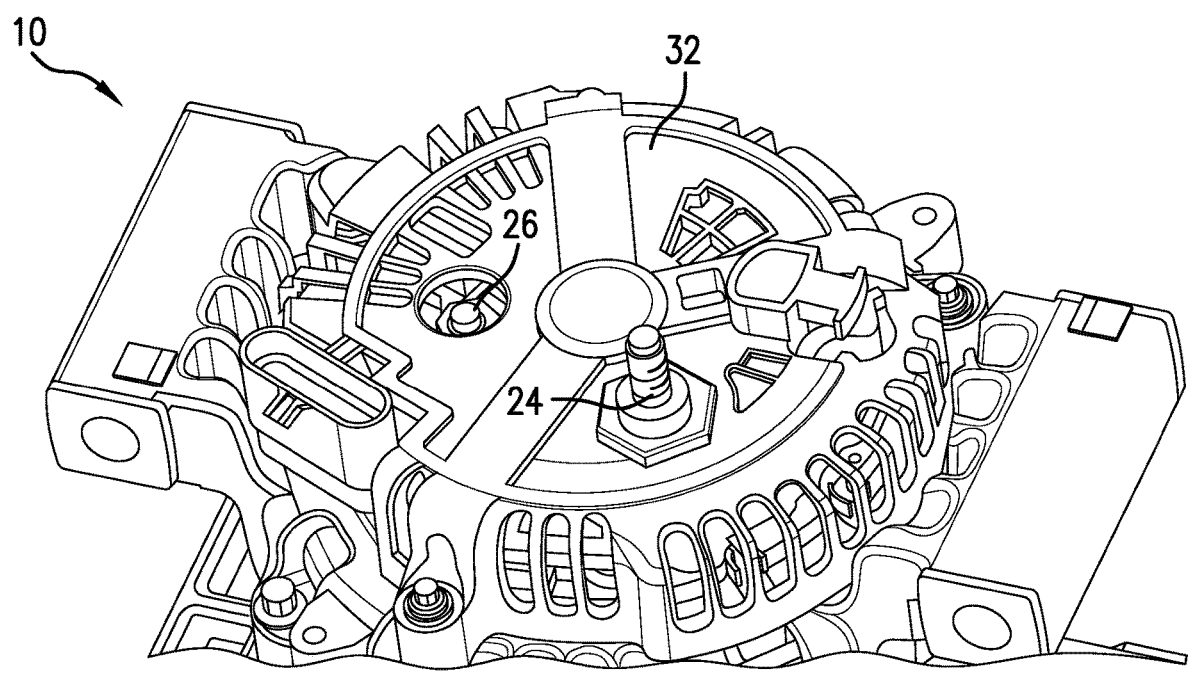
Figure 14C:
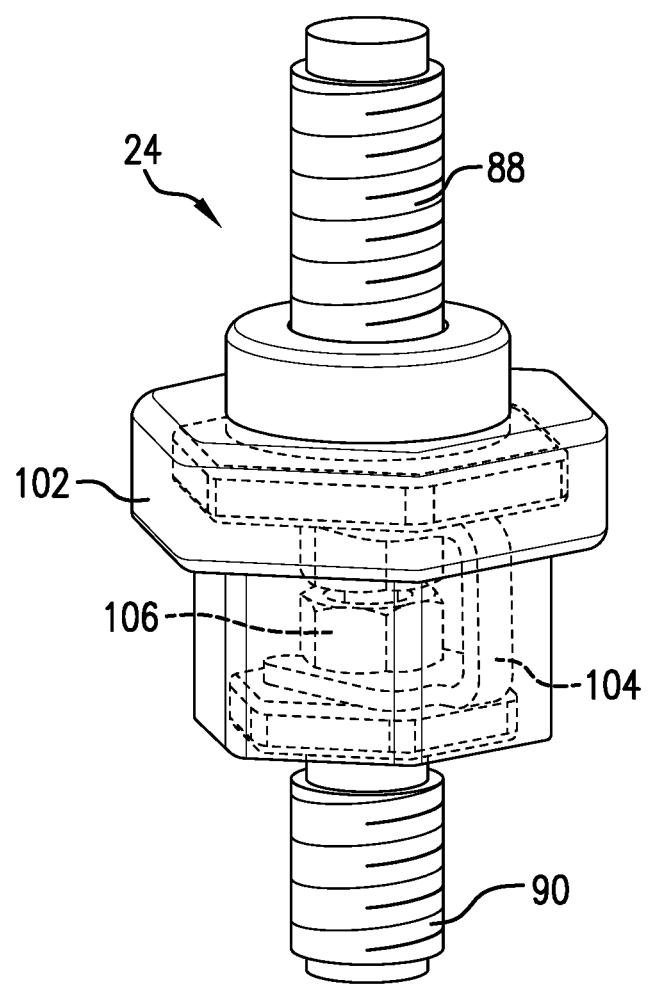

FIGS. 13A-C show an example of the connection terminal 24 that includes the upper component 88 and the lower component 90 (e.g., upper and lower studs). In this example, the connection terminal 24 includes a fusible link 104 having one end connected to the upper component 88 and another end connected to the lower component 90. The lower component 90 and/or the regulator terminal 26 may be embedded in or otherwise connected to the heat sink 20. The components and the ends of the fusible link 104 are separated by a spacer 106 such as a ceramic spacer. The connection terminal may include insulating material 102 that isolates the connection terminal 24 from the cover 32. FIGS. 14A-C show an alternative configuration of the connection terminal, in which the spacer 106 includes one or more (e.g., two) anodized nuts.

Figure 15A:
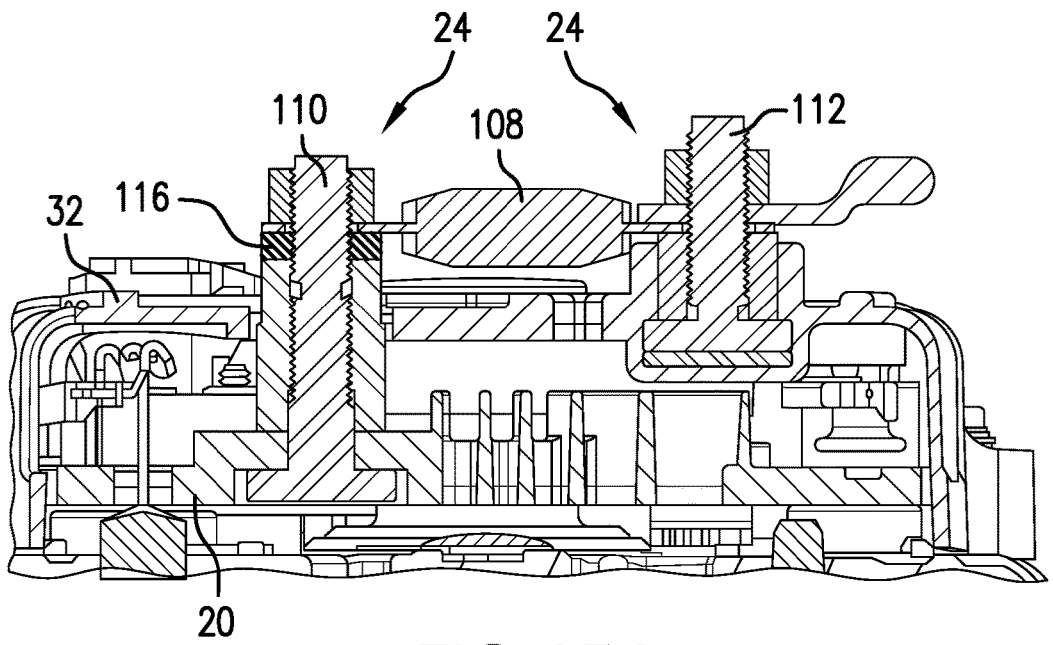
Figure 15B:
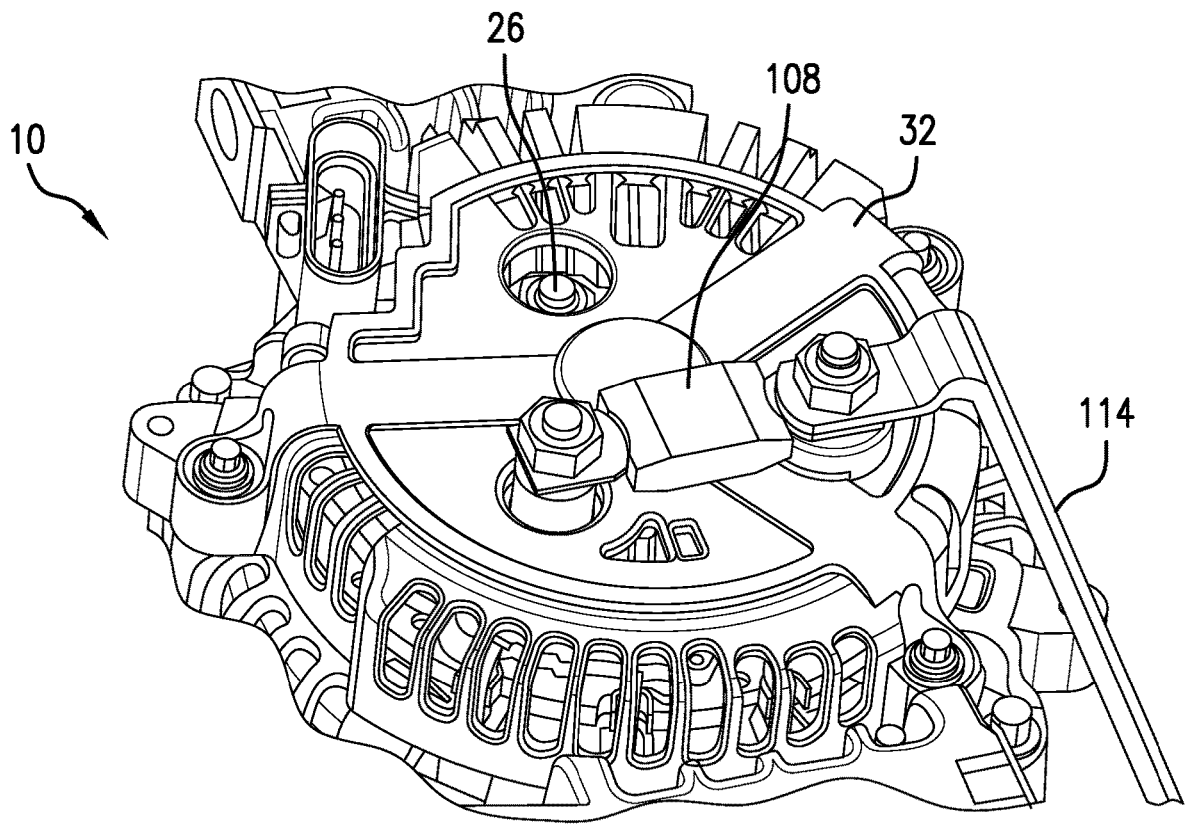

FIGS. 15A-B show an alternative configuration of the battery connection terminal 24, which includes components connected by a fusible link 108. In this embodiment, the connection terminal 24 includes a conductive component 110 connected to the heat sink 20, and an additional conductive component 112 embedded in or otherwise attached to the cover 32. The additional conductive component 112 may be connected to the battery via, e.g., connector cable 114. In this example, the additional component is a metal stud, which may be connected via the fusible link 108 to an existing battery connection stud (e.g., where the component 110 is an existing stud). In this example, a washer or other extender 116 is coupled to the existing stud.

Embodiments described herein can be utilized in various methods, such as methods of operating a power network (e.g., a vehicle power network) and methods of isolating alternator components and/or other sections of a power network in the event of a failure or other undesirable condition. Embodiments can also be utilized in methods of operating and/or isolating sub-networks in a power network.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An alternator for generating electrical power to one or more components of a power network, comprising:
    a machine portion including a stator, a rotor and a rectifier;
    a battery connection terminal connected to the machine portion and configured to be connected to a battery; and
    an isolation device integral to the alternator, the isolation device located on an electrical path between at least the machine portion and the battery connection terminal, the isolation device configured to isolate at least one of the alternator and another component of the power network from receiving electric current from the battery based on an undesirable condition occurring in the power network.

2. The alternator of claim 1, further comprising a regulator configured to adjust an output of the alternator, and a rectifier terminal connected to the regulator.

3. The alternator of claim 2, wherein the isolation device is configured to isolate both the machine portion and the regulator.

4. The alternator of claim 3, wherein the machine portion and the regulator are connected to the rectifier terminal, and the isolation device is located on an electrical path extending between the rectifier terminal and the battery connection terminal.

5. The alternator of claim 2, wherein the isolation device is configured to isolate the machine portion while allowing current to be supplied by the battery to the regulator.

6. The alternator of claim 5, wherein the machine portion is connected to the rectifier terminal, the isolation device is located on an electrical path extending between the rectifier terminal and the battery connection terminal, and the regulator is connected to the battery connection terminal and the battery via an electrical path that bypasses the rectifier terminal.

7. The alternator of claim 1, wherein the isolation device is a fuse configured to open in response to an amount of current through the alternator exceeding a threshold value.

8. The alternator of claim 1, wherein the isolation device is a diode configured to prevent current from flowing into at least the machine portion from the battery.

9. The alternator of claim 8, wherein the diode is configured to divide the power network into at least a first sub-network and a second sub-network.

10. The alternator of claim 1, wherein the battery connection terminal includes a first conductive component and a second conductive component physically separated from the first conductive component, the first conductive component connected to at least the machine portion, the second conductive component configured to be connected to the battery.

11. The alternator of claim 10, wherein the second conductive component is electrically connected to the isolation device and configured to prevent current from flowing through the battery connection terminal.

12. The alternator of claim 11, wherein the battery connection terminal includes an electrically insulating material disposed within the battery connection terminal and between the first conductive component and the second conductive component.

13. A method of controlling electrical power supply to one or more components of a power network, the method comprising:
  operating a machine portion of an alternator to generate electricity, the machine portion including a stator, a rotor and a rectifier;
  transmitting electric power to a battery via a battery connection terminal of the alternator; and
  based on an undesirable condition occurring in the power network, isolating at least one of the alternator and another component of the power network from receiving electric current from the battery, the isolating performed by an isolation device integral to the alternator, the isolation device located on an electrical path between at least the machine portion and the battery connection terminal.

14. The method of claim 13, wherein the alternator includes a regulator configured to adjust an output of the alternator, and a rectifier terminal connected to the regulator.

15. The method of claim 14, wherein isolating the alternator includes isolating both the machine portion and the regulator via the isolation device.

16. The method of claim 15, wherein the machine portion and the regulator are connected to the rectifier terminal, and the isolation device is located on an electrical path extending between the rectifier terminal and the battery connection terminal.

17. The method of claim 14, wherein isolating the alternator includes isolating the machine portion via the isolation device while allowing current to be supplied by the battery to the regulator.

18. The method of claim 17, wherein the machine portion is connected to the rectifier terminal, the isolation device is located on an electrical path extending between the rectifier terminal and the battery connection terminal, and the regulator is connected to the battery connection terminal and the battery via an electrical path that bypasses the rectifier terminal.

19. The method of claim 13, wherein the isolation device is a fuse configured to open in response to an amount of current through the alternator exceeding a threshold value.

20. The method of claim 13, wherein the isolation device is a diode configured to prevent current from flowing into at least the machine portion from the battery.

* * * * *